United States Patent
Harada (10) Patent No.: US 7,133,072 B2
(45) Date of Patent: Nov. 7, 2006

(54) IMAGE PROCESSING APPARATUS HAVING AN IMAGE CORRECTION CIRCUIT AND ITS PROCESSING METHOD

(75) Inventor: Yoshihito Harada, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 772 days.

(21) Appl. No.: 09/896,666

(22) Filed: Jun. 29, 2001

(65) Prior Publication Data
US 2002/0015111 A1 Feb. 7, 2002

(30) Foreign Application Priority Data
Jun. 30, 2000 (JP) .............................. 2000-198019
Jun. 27, 2001 (JP) .............................. 2001-194378

(51) Int. Cl.
*H04N 9/64* (2006.01)

(52) U.S. Cl. ..................................................... 348/243

(58) Field of Classification Search ................ 348/247, 348/243–245, 246, 241
See application file for complete search history.

(56) References Cited

U.S. PATENT DOCUMENTS

| | | | | | |
|---|---|---|---|---|---|
| 3,904,818 | A | * | 9/1975 | Kovac .......................... | 348/243 |
| 4,600,946 | A | * | 7/1986 | Levine ......................... | 348/246 |
| 4,703,442 | A | * | 10/1987 | Levine ......................... | 348/247 |
| 4,920,428 | A | * | 4/1990 | Lin et al. ..................... | 348/246 |
| 5,008,757 | A | * | 4/1991 | Kimura et al. ............. | 348/229.1 |
| 5,047,861 | A | * | 9/1991 | Houchin et al. ............. | 348/247 |
| 5,416,516 | A | * | 5/1995 | Kameyama et al. ........ | 348/246 |
| 5,477,265 | A | * | 12/1995 | Tani ............................ | 348/241 |
| 5,541,706 | A | * | 7/1996 | Goto ........................... | 396/231 |
| 5,610,654 | A | * | 3/1997 | Parulski et al. .......... | 348/229.1 |
| 5,625,413 | A | * | 4/1997 | Katoh et al. ................ | 348/246 |
| 5,929,901 | A | * | 7/1999 | Adair et al. .................. | 348/76 |
| 6,307,393 | B1 | * | 10/2001 | Shimura ..................... | 348/247 |
| 6,654,054 | B1 | * | 11/2003 | Embler ....................... | 348/247 |
| 6,683,643 | B1 | * | 1/2004 | Takayama et al. .......... | 348/247 |
| 6,940,549 | B1 | * | 9/2005 | Dillen et al. ................ | 348/246 |
| 6,995,794 | B1 | * | 2/2006 | Hsu et al. ................... | 348/241 |
| 2004/0032490 | A1 | * | 2/2004 | Uchida ....................... | 348/265 |

FOREIGN PATENT DOCUMENTS

| | | | | |
|---|---|---|---|---|
| JP | 06006595 | A | * | 1/1994 |
| JP | 6-303531 | | | 10/1994 |
| JP | 11-239298 | | | 8/1999 |

* cited by examiner

*Primary Examiner*—Vivek Srivastava
*Assistant Examiner*—Jason Whipkey
(74) *Attorney, Agent, or Firm*—Morgan & Finnegan, L.L.P.

(57) ABSTRACT

An image processing apparatus for processing an image sensed by an image sensing element such as a CCD sensor includes a dark correction circuit for making dark correction of the image, a defect correction circuit for correcting a defective pixel in the image using other pixels, and a controller for controlling the shares of dark correction by the dark correction circuit and defect correction by the defect correction circuit on the basis of information which pertains to image sensing such as an ISO speed, temperature, and accumulation time.

24 Claims, 6 Drawing Sheets

| G1 | R1 | G2 | R2 | G3 |
|----|----|----|----|----|
| B1 | G4 | B2 | G5 | B3 |
| G6 | R3 | G7 | R4 | G8 |
| B4 | G9 | B5 | G10 | B6 |
| G11 | R5 | G12 | R6 | G13 |

DEFECT ADDRESS TABLE GROUP
ADRS ( ISO, TMP, Tint )

| ADRS ( ISO100, ≦40°C, 1sec ) |
| ADRS ( ISO100, 40°C~50°C, 1sec ) |
| ADRS ( ISO100, 50°C~60°C, 1sec ) |
| ADRS ( ISO100, ≧60°C, 1sec ) |

FIG. 6B

DATA STRUCTURE OF ADRSC ( ISO, TMP, Tint )

| X-COORDINATE | Y-COORDINATE | CORRECTION RULE |
|---|---|---|
| XPOS | YPOS | RLn |

IMAGE PROCESSING APPARATUS HAVING AN IMAGE CORRECTION CIRCUIT AND ITS PROCESSING METHOD

FIELD OF THE INVENTION

The present invention relates to an image processing apparatus for correcting any defects of an image sensing element, and its processing method.

BACKGROUND OF THE INVENTION

An image sensing element such as a CCD sensor, CMOS sensor, or the like has defective pixels called white spots with abnormally large dark currents, which often deteriorate the image performance of the image sensing element. By correcting such defective pixels by defect correction, the yield of expensive image sensing elements can be improved.

However, a high-end digital camera must provide high-quality images even under severe image sensing conditions such as high ISO (International Organization for Standardization) speed rating, long shutter time, and high temperature. The ISO speed indicates the sensitivity of a film to light, and is indicated by a converted value in a digital camera.

For this purpose, defective pixels under such worst conditions (i.e., high ISO speed, long shutter time, and high temperature) may be picked up, and undergo defect correction. However, in such case, information of pixels which do not have so large dark currents and can be used without correction is discarded, thus narrowing down an effective dynamic range.

In Japanese Patent Laid-Open No. 6-303531, white spots having temperature dependence are detected using a predetermined threshold value, and undergo defect correction. As a result, variations (dark current nonuniformity) equal to or smaller than the threshold value remain uncorrected in an image.

Furthermore, in Japanese Patent Laid-Open No. 11-239298, white spots (white scratches) which increase/decrease in accordance with the exposure time merely undergo defect correction in accordance with the exposure time, and nonuniformity of pixels which remain uncorrected cannot be removed.

In case of a system such as a digital still camera which changes the amplifier gain in correspondence with the ISO speed, the aforementioned problem is serious. In such system, an appropriate exposure value changes, and an output signal in an image changes. As for the output signal, amplification of the signal is controlled based on, e.g., the amplifier gain in consideration of the amplitude of A/D conversion.

For example, when ISO speed=100, a signal obtained from a light amount of 0.1 lux·sec is output as a 1× signal; when ISO speed=200, a signal obtained from a light amount of 0.05 lux·sec is output as a 2× signal; and when ISO speed=400, a signal obtained from a light amount of 0.025 lux·sec is output as a 4× signal.

That is, since the occupation ratio of dark voltage non-uniformity in the value obtained by an A/D converter changes upon a change in ISO speed (amplifier gain), a serious problem is posed. Note that the signal may be amplified not by the amplifier gain but by output control of an A/D converter or the like. However, in case of the output control of an A/D converter, it may become harder to control the signal than the amplifier gain.

Even when the A/D converter has bit precision or broad dynamic range with which the occupation ratio does not suffer, pixels originally having dark currents like white spots (white scratches) cannot be covered by only dark correction since they suffer large fluctuation components called dark current shot noise.

SUMMARY OF THE INVENTION

It is an object of the present invention to provide an image processing apparatus which can generate a high-quality image while assuring a broad effective dynamic range, and its processing method.

According to the first aspect of the present invention, an image processing apparatus for processing an image is provided, the apparatus comprising an image sensing element having a plurality of photoelectric conversion units, a first correction unit for correcting a signal from the photoelectric conversion unit, a dark level of which reaches a predetermined level, using signals from other photoelectric conversion units, the dark level being a level of a signal output from the image sensing element in the dark, and a controller for changing the predetermined level in accordance with information that pertains to image sensing.

According to the preferred embodiments of the present invention, the apparatus further comprises a second correction unit for subtracting a second signal output from the image sensing unit in the dark from a first signal output from the image sensing element.

According to the preferred embodiments of the present invention, the information that pertains to image sensing includes at least one of three factors, i.e., a temperature, an accumulation time of the image sensing element, and an ISO speed.

According to the preferred embodiments of the present invention, the information that pertains to image sensing includes three factors, i.e., a temperature, an accumulation time of the image sensing element, and an ISO speed.

According to the preferred embodiments of the present invention, the controller comprises a plurality of defective pixel tables prepared in correspondence with a plurality of image sensing conditions, and a defective pixel instruction unit for selecting one defective pixel table from the plurality of defective pixel tables on the basis of the information that pertains to image sensing, and indicates a defective pixel to be corrected by the first correction unit thereto on the basis of the selected defective pixel table.

According to the preferred embodiments of the present invention, the first correction unit determines a pixel value of a defective pixel to be corrected on the basis of surrounding pixels of that defective pixel.

According to the preferred embodiments of the present invention, the first correction unit determines a pixel value of a defective pixel to be corrected on the basis of an average value of surrounding pixels of that defective pixel.

According to the preferred embodiments of the present invention, the image sensing element includes a CCD sensor or a CMOS sensor.

According to the second aspect of the present invention, an image processing apparatus for processing an image is provided, the apparatus comprising an image sensing element for sensing an object, a defect correction unit for correcting a defective pixel in the image using other pixels, and a controller for controlling a gain of a signal output from the image sensing element and the number of defective pixels in the defect correction unit in association with each other.

According to the preferred embodiments of the present invention, the controller controls the gain in association with the number of defective pixels in the defect correction unit.

According to the preferred embodiments of the present invention, the controller controls the number of defective pixels in the defect correction unit in association with the gain.

According to the preferred embodiments of the present invention, the controller controls to decrease the number of defective pixels in the defect correction unit with increasing gain.

According to the preferred embodiments of the present invention, the controller controls to increase the number of defective pixels in the defect correction unit with decreasing gain.

According to the preferred embodiments of the present invention, the controller comprises a plurality of defective pixel tables prepared in correspondence with a plurality of image sensing conditions, and a defective pixel instruction unit for selecting one defective pixel table from the plurality of defective pixel tables on the basis of information that pertains to image sensing, and indicates a defective pixel to be corrected by the defect correction unit thereto on the basis of the selected defective pixel table.

According to the preferred embodiments of the present invention, the defect correction unit determines a pixel value of a defective pixel to be corrected on the basis of surrounding pixels of that defective pixel.

According to the preferred embodiments of the present invention, the image sensing element includes a CCD sensor or a CMOS sensor.

According to the third another aspect of the present invention, an image processing method for processing an image sensed by an image sensing element having a plurality of photoelectric conversion units is provided, the method comprising the first correction step of correcting a signal from the photoelectric conversion unit, a dark level of which reaches a predetermined level, using signals from other photoelectric conversion units, the dark level being a level of a signal output from the image sensing element in the dark, and the control step of changing the predetermined level in accordance with information that pertains to image sensing.

According to the fourth aspect of the present invention, an image processing method for processing an image sensed by an image sensing element for sensing an object is provided, the method comprising the defect correction step of correcting a defective pixel in the image using other pixels, and the control step of controlling a gain of a signal output from the image sensing element and the number of defective pixels in the defect correction step in association with each other.

According to the fifth aspect of the present invention, a memory medium that stores software for implementing an image processing method for processing an image sensed by an image sensing element is provided, the software comprising the first correction step of correcting a signal from a photoelectric conversion unit, a dark level of which reaches a predetermined level, using signals from other photoelectric conversion units, the dark level being a level of a signal output from the image sensing element in the dark, and the control step of changing the predetermined level in accordance with information that pertains to image sensing.

According to the sixth aspect of the present invention, a memory medium that stores software for implementing an image processing method for processing an image sensed by an image sensing element is provided, the software comprising the defect correction step of correcting a defective pixel in the image using other pixels, and the control step of controlling a gain of a signal output from the image sensing element and the number of defective pixels in the defect correction step in association with each other.

According to the seventh aspect of the present invention, software for implementing an image processing method for processing an image sensed by an image sensing element is provided, the software comprising the first correction step of correcting a signal from a photoelectric conversion unit, a dark level of which reaches a predetermined level, using signals from other photoelectric conversion units, the dark level being a level of a signal output from the image sensing element in the dark, and the control step of changing the predetermined level in accordance with information that pertains to image sensing.

According to the eighth aspect of the present invention, software for implementing an image processing method for processing an image sensed by an image sensing element is provided, the software comprising the defect correction step of correcting a defective pixel in the image using other pixels, and the control step of controlling a gain of a signal output from the image sensing element and the number of defective pixels in the defect correction step in association with each other.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
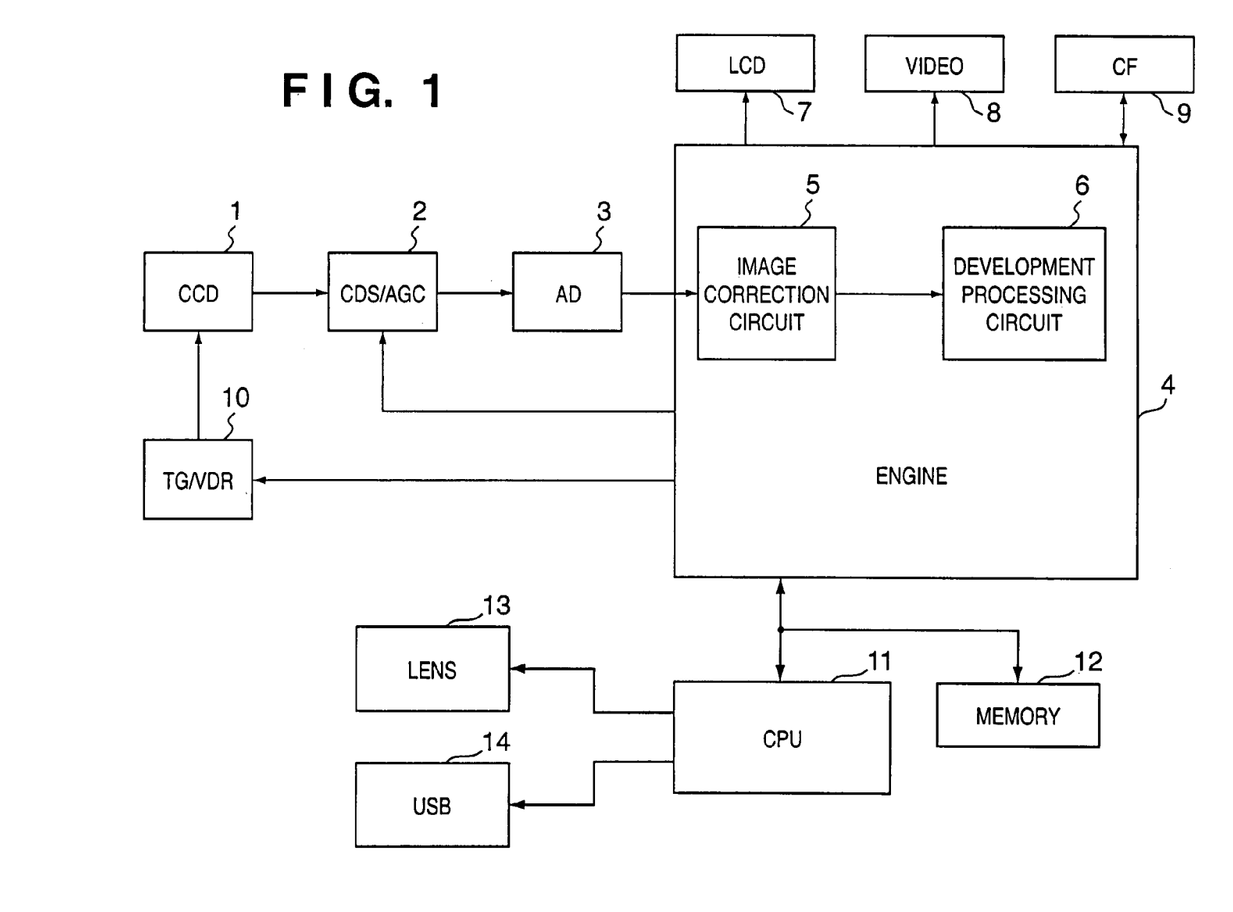
FIG. 1 is a block diagram showing the overall arrangement of an image processing apparatus (digital camera) according to a preferred embodiment of the present invention.

FIG. 1 is a block diagram of a digital camera (image processing apparatus) using an image sensing element having a plurality of photoelectric conversion units, such as a CCD sensor, CMOS sensor, or the like. An output from a CCD 1 as an image sensing element having a plurality of photoelectric conversion units undergoes noise reduction and gain adjustment in a CDS/AGC 2, and the output from the CDS/AGC 2 is converted from an analog signal into a digital signal by an A/D converter 3. The digital signal is input to an engine 4 as a digital signal processing IC.

The engine 4 includes an image signal correction circuit 5 and development processing circuit 6. An image signal input to the engine 4 undergoes dark correction and defect correction in the image signal correction circuit 5, and then undergoes a development process such as a color interpolation process or the like in the development processing circuit 6. The developed image signal is saved in a memory 12.

The developed image is displayed on a display (LCD) 7 such as a TFT liquid crystal display or the like, or is output to an external monitor or the like via a video terminal (VIDEO) 8 or the like.

The developed image can be saved in an external memory 9 (e.g., a CF card (flash memory card) or the like). Furthermore, the engine 4 drives a timing generator (TG/VDR) 10 to generate clock signals and the like to be supplied to the CCD 1.

A microprocessor (CPU) 11 is connected to the engine 4. Various setups are made in the engine 4 in accordance with commands from the CPU 11, and the operation of the engine 4 is managed by the CPU 11. The memory 12 is used as a work area, and to store programs to be provided to the CPU 11 or to temporarily store a sensed image.

An interface 14 such as a USB interface or the like as a serial communication device is connected to the CPU 11, which can output image data to an external personal computer or the like via that interface. A lens (LENS) 13 is an optical system for sensing an image, and has actuators for adjusting its iris and focus. The actuators are controlled in accordance with instructions from the CPU 11.

Figure 2:
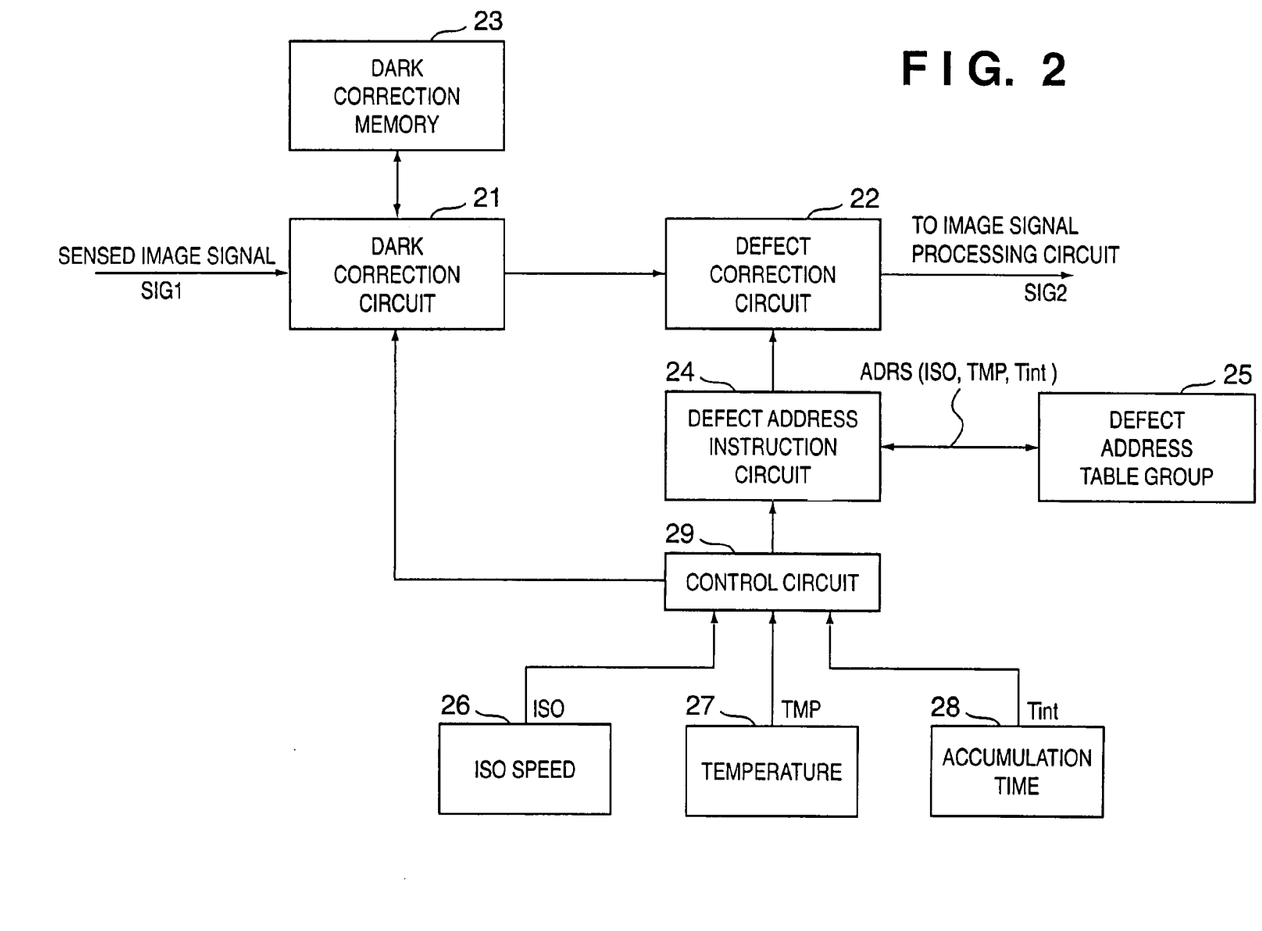
FIG. 2 is a partial block diagram of the image processing apparatus shown in FIG. 1.

FIG. 2 shows the internal blocks of the image signal correction circuit 5. A sensed image signal SIG1 output from the A/D converter 3 undergoes dark correction by a dark correction circuit 21. A dark correction memory 23 is used as a work area of the dark correction circuit 21.

Figure 3A:
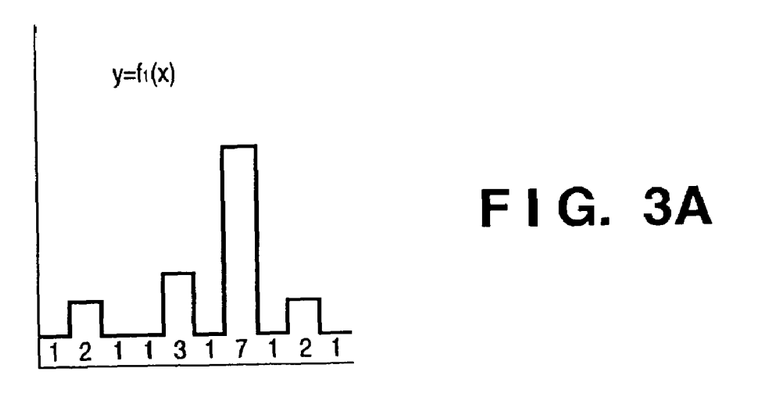
FIGS. 3A to 3C are graphs showing dark correction.
Figure 3B:
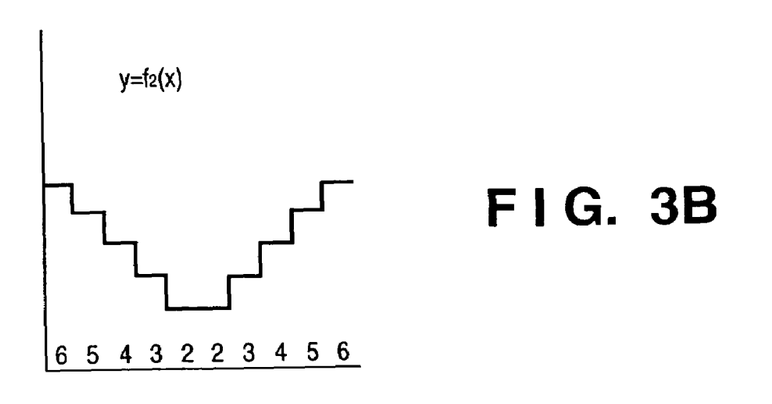

Dark correction will be explained below with reference to FIGS. 3A to 3C. The output voltage signal of the CCD sensor 1 often fluctuates even in the dark due to variations of dark currents, as shown in FIG. 3A. If the sensor suffers variations "1, 2, 1, 1, 3, 1, 7, 1, 2, 1" like y=f1 (x) in FIG. 3A, even when an object pattern "6, 5, 4, 3, 2, 3, 4, 5, 6" having bright, dark, and bright luminance distributions like f2 (x) in FIG. 3B is sensed, the dark voltage f1 (x) is superposed on this pattern to output a pattern "7, 7, 5, 4, 5, 3, 10, 5, 7, 7" indicated by f3 (x) in FIG. 3C.

Figure 3C:
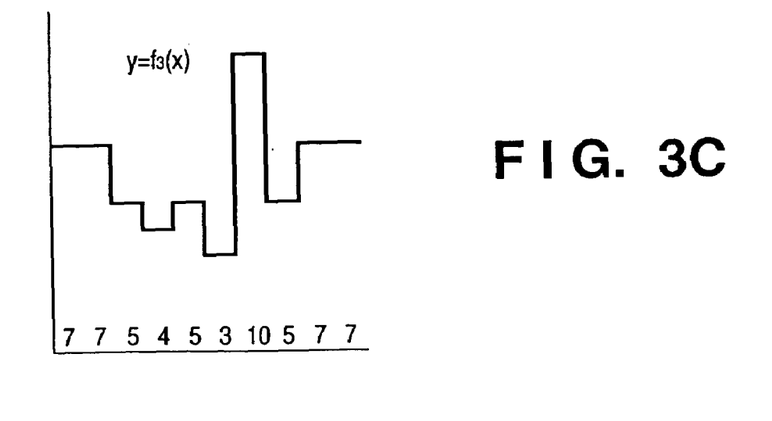

A true signal f2 (x) cannot be figured from the pattern f3 (x) in FIG. 3C. However, by capturing a dark signal f1 (x), and computing f2 (x)=f3 (x)−f1 (x) using that signal, an original object image indicated by f2 (x) can be reclaimed.

To implement such process, dark image data is captured from the CCD sensor 1 which is shielded by a mechanical shutter under the same conditions (temperature, charge accumulation time, and ISO speed rating (amplifier gain)) as those upon sensing an object image, and is subtracted from the sensed image data obtained by sensing an object image.

A description will revert to FIG. 2. A defect correction circuit 22 is connected to the output side of the dark correction circuit 21. The defect correction circuit 22 corrects any defects of pixels, which cannot be corrected by dark correction, by interpolation using surrounding normal pixels. The circuit 22 then passes an image signal SIG2 that has undergone defect correction, to the image signal processing circuit 6 (see FIG. 1).

Figure 4:
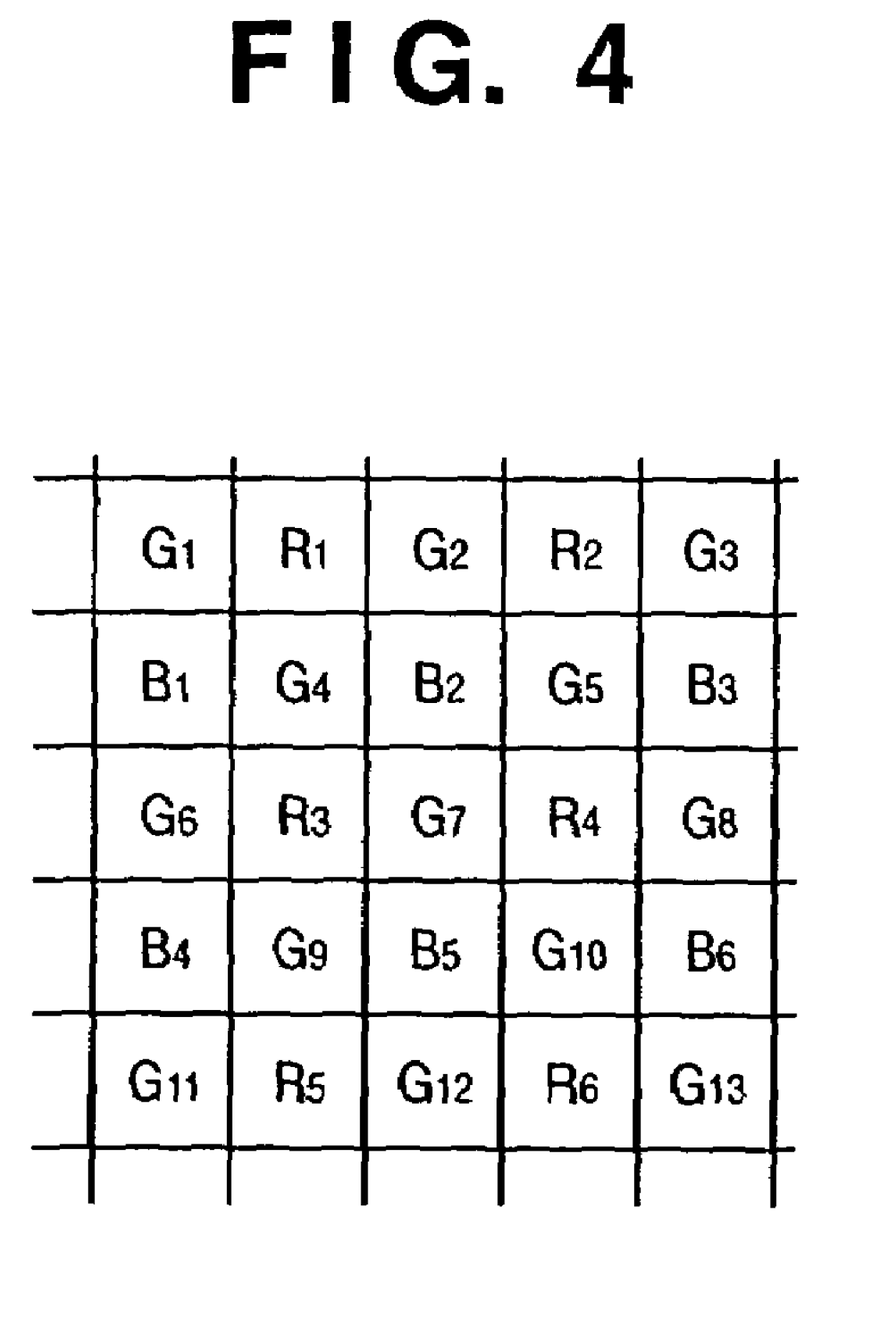
FIG. 4 is an explanatory view of defect correction.

Defect correction will be explained below with reference to FIG. 4. The output signal from the CCD sensor 1 often includes pixel defects or pixels having abnormally large dark currents. For example, in a primary color Bayer matrix shown in FIG. 4, G1 to G13 represent green pixel, R1 to R6 red pixels, and B1 to B6 blue pixels. If pixel G7 is defective, defect correction can be implemented by selecting one of some following correction rules.

Rule 1 (RL1) is horizontal interpolation and uses the average value of horizontally neighboring pixels of the same color, as described by:

$$G7=(G6+G8)/2$$

Rule 2 (RL2) is vertical interpolation and uses the average value of vertically neighboring pixels of the same color, as described by:

$$G7=(G2+G12)/2$$

Rule 3 (RL3) is horizontal & vertical interpolation, and uses the average value of horizontally and vertically neighboring pixels of the same color, as described by:

$$G7=(G2+G6+G8+G12)/4$$

Rules 1 to 3 can be applied to green, red, and blue pixels.

Rule 4 (RL4) is oblique interpolation, and uses the average value of obliquely neighboring pixels of the same color, as described by:

$$G7=(G4+G10)/2$$

Rule 5 (RL5) is another oblique interpolation, and uses the average value of obliquely neighboring pixels of the same color, as described by:

$$G7=(G5+G9)/2$$

Rule 6 (RL6) is double oblique interpolation, and users the average value of four pixels of the same color, which neighbor in two oblique directions.

$$G7=(G4+G5+G9+G10)/4$$

Rules 4 to 6 can be applied only to green pixels in such primary color Bayer matrix. Defect correction can be done by selecting and using one of these rules. Selection is made to use highly reliable pixel data around the defective pixel.

For example, upon correcting defective pixel G7, if G8 is also defective, since rules 1 and 3 cannot be selected, rule 2 is preferably selected. Of course, rules 4 to 7 cannot be selected for red and blue pixels. In general, a defect (error) is less conspicuous if interpolation is made using pixels having shorter distance. In some cases, the gradient of the pixel outputs around the defective pixel is noted, and which one of horizontal interpolation (rule 1), vertical interpolation (rule 2), horizontal & vertical interpolation (rule 3), and oblique interpolation (rule 4, 5, or 6) is preferable can be determined based on this gradient. Furthermore, two-pixel averaging (rule 1, 2, 4, or 5) is more likely to reclaim a sharper image than 4-pixel averaging (rule 3 or 7), and 4-pixel averaging is preferably used least frequently.

In this way, defect correction makes interpolation based on surrounding normal pixel data. However, if interpolation is used too much, an unnatural portion becomes conspicuous in a whole image.

On the other hand, dark correction merely adds a "pedestal" corresponding to dark current variations or the like to the image signal, and correct image data can be provided if appropriate dark correction is done. However, dark correction cannot effectively use a portion corresponding to a maximum value (i.e., the value of a pixel with the largest dark voltage) of a value to be subtracted from the image signal value in dark correction of the full range of a digital value after A/D conversion, as can be seen from FIGS. 3A to 3C. In other words, when an image sensing element (CCD sensor, CMOS sensor, or the like) which suffers a large dark voltage is used, its full range cannot be effectively used.

More specifically, if the bit width of an output signal y of the CCD sensor is 8 bits in FIG. 3B, the value y can originally assume "0" to "255". However, if the dark voltage varies within the range from "1" to "7" as in FIG. 3B, a value of around 248 (=255−7) must be used as the upper limit value of an image signal to execute dark correction of an image signal so as to remove the influences of the dark voltage.

Likewise, if the dark voltage varies within the range from "1" to "10", a value of around 245 (=255−10) must be used as the upper limit value of an image signal to execute dark correction of an image signal so as to remove the influences of the dark voltage. That is, the predetermined value for dark correction varies.

The aforementioned problem appears more conspicuously when a CCD sensor with low quality is used. Also, the aforementioned problem appears conspicuously in a high-temperature environment, when high ISO speed and high analog amplifier gain are to be set, and when an accumulation time such as a shutter time (exposure time) is long. When a high analog amplifier gain is set upon setting high ISO speed, the value of dark voltage nonuniformity in the value obtained by an A/D converter becomes large. For example, if a signal obtained from a light amount of 0.1 lux·sec is output as a 1× signal when ISO speed=100; a signal obtained from a light amount of 0.05 lux·sec is output as a 2× signal when ISO speed=200; and a signal obtained from a light amount of 0.025 lux·sec is output as a 4× signal when ISO speed=400, the following problem is posed. That is, when ISO speed=400, a signal amount obtained from a light amount is smaller than that in case of ISO speed=100, but the dark voltage is large. Therefore, when this signal amplified by a factor of 4, a signal value as an absolute amount becomes smaller than the dark voltage value. In general, when a signal is amplified, the S/N ratio impairs. Hence, when high ISO speed is set, the problem becomes conspicuous.

For this reason, a pixel having a given dark voltage or more is given up to be corrected by dark correction and is corrected by defect correction so as to assure a broad dynamic range, thus maintaining good balance as a system. That is, the share of dark correction and that of defect correction upon correcting an image are preferably determined in accordance with some information.

If the shares are permanently set based on a dark voltage under the worst conditions of temperature, ISO speed, and accumulation time to assure a desired effective dynamic range, since the share of defect correction is always large, the image quality impairs. Therefore, the share of dark correction and that of defect correction are preferably determined based on a dark voltage obtained upon varying respective parameters of the temperature, ISO speed, and accumulation time.

Figure 5A:
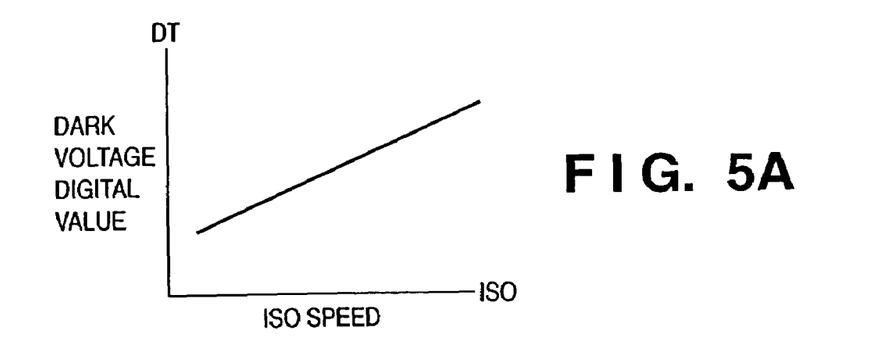
FIGS. 5A to 5C are graphs showing the relationships among respective factors of defect correction.
Figure 5B:
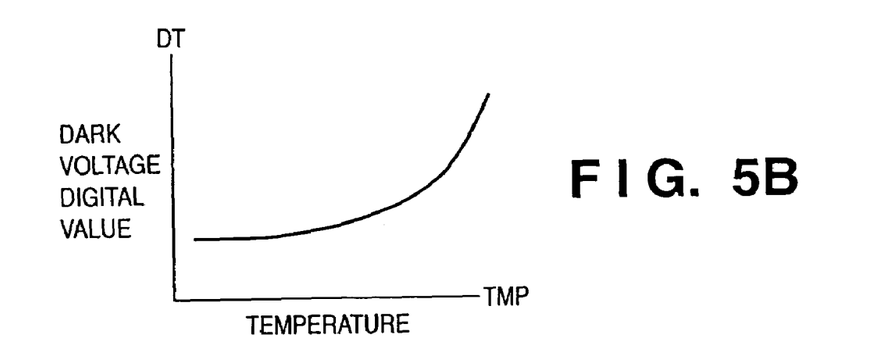
Figure 5C:
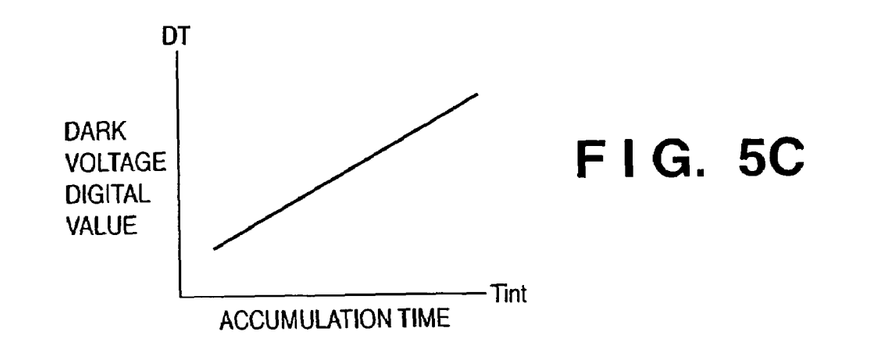

A description will be given with reference to FIGS. 5A to 5C. FIG. 5A is a graph showing the relationship between the ISO speed (ISO) and dark voltage digital value (DT), FIG. 5B is a graph showing the relationship between the temperature (TMP) and dark voltage digital value (DT), and FIG. 5C is a graph showing the relationship between the accumulation time (Tint) and dark voltage digital value (DT), FIG. 5B shows the way the dark voltage digital value (DT) increases as the temperature (TMP) rises. The dark voltage doubles upon a temperature rise of around 8° C. at ordinary temperature. The dark voltage digital value exponentially increases with respect to the temperature rise, as shown in FIG. 5B.

Therefore, when pixel values that exceed a predetermined dark voltage value are corrected by defect correction so as not to impair the dynamic range, the number of pixels which are to undergo defect correction also increases exponentially in this fashion.

On the other hand, the dark voltage digital value linearly increases with increasing gain in association with the ISO speed (FIG. 5A) or with increasing accumulation time (FIG. 5C). Hence, the number of pixels which are to undergo defect correction increases with increasing ISO speed and accumulation time, but a change is smaller than that upon an increase in temperature.

In this embodiment, a pixel which is to undergo defect correction (address of that pixel) is determined in accordance with at least one of the temperature, ISO speed, and accumulation time, and more preferably, a combination of the temperature, ISO speed, and accumulation time.

To implement this, circuit blocks shown in FIG. 2 are used. The following explanation will be given using FIG. 2. A defect address instruction circuit 24 looks up an optimal address table in a memory 25 that stores a defect address table group including a plurality of defect address tables (defective pixel tables), and sends the address of a pixel which is to undergo defect correction to the defect correction circuit 22 at an optimal timing on the basis of that table. The defect correction circuit 22 specifies a pixel having a large dark voltage, which cannot be corrected by the dark correction circuit 21, on the basis of that address, and makes defect correction of the pixel. Each defect address table provides an address (coordinates) of a pixel (the dark voltage of which becomes larger than a level required for assuring a desired dynamic range) which becomes a defective pixel under corresponding image sensing conditions (ISO speed, temperature, accumulation time, and the like).

The control circuit 29 receives some factors which dominate the dark voltage. Such factors include the ISO speed, temperature, and accumulation time of the CCD sensor 1. Of these factors, the ISO speed is provided by an ISO speed holding unit 26 which holds the set ISO speed, the temperature (TMP) is provided by a thermometer (e.g., a temperature measuring element) 27, and the accumulation time (Tint) is provided by an accumulation time holding unit 28 which holds the set accumulation time. Upon receiving those pieces of information, the control circuit 29 controls the defect address instruction circuit 24. Also, the control circuit 29 controls the dark correction circuit. The defect address instruction circuit 24 specifies an address table which matches the input information from the defect address table group stored in the memory 25, and looks up the specified table, as described above.

Figure 6A:
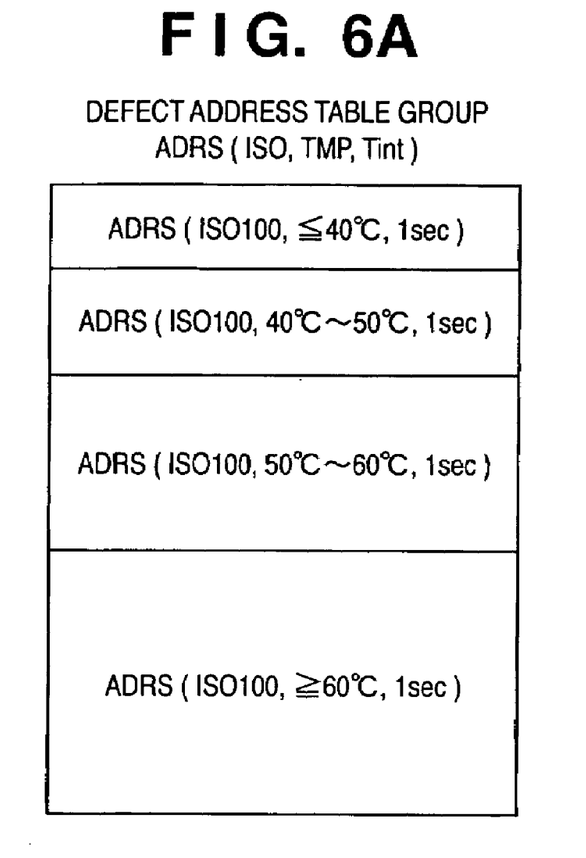
FIGS. 6A and 6B show a defective address table group, and the data structure of a defective address table.

FIG. 6A illustrates the defect address table group stored in the memory 25. FIG. 6A shows defect address (ADRS) tables when the temperature (TMP) varies at ISO speed=100 and accumulation time (Tint)=1 sec. In this example, the defect address tables are prepared in correspondence with the temperature (TMP) ranges of 40° C. or lower, 40° C. to 50° C., 50° C. to 60° C., and 60° C. or higher. Note that for signals from photoelectric conversion units whose dark level reaches a first predetermined level, a defect address table ADRS(ISO100, 40° C. or less, 1 sec) is used; for signals from photoelectric conversion units whose dark level reaches a second predetermined level, a defect address table ADRS(ISO100, 40° C. to 50° C., 1 sec) is used; for signals from photoelectric conversion units whose dark level reaches a third predetermined level, a defect address table ADRS(ISO100, 50° C. to 60° C., 1 sec) is used; and for signals from photoelectric conversion units whose dark level reaches a fourth predetermined level, a defect address table ADRS(ISO100, 60° C. or higher, 1 sec) is used. The same applies to tables using ISO speed and accumulation time as parameters.

Since the dark voltage varies exponentially with respect to a change in temperature, as described above, and the number of pixels which are to undergo defect correction increases abruptly with increasing temperature, the volumes of the defect address tables increase in such way, as shown in FIG. 6A.

Figure 6B:
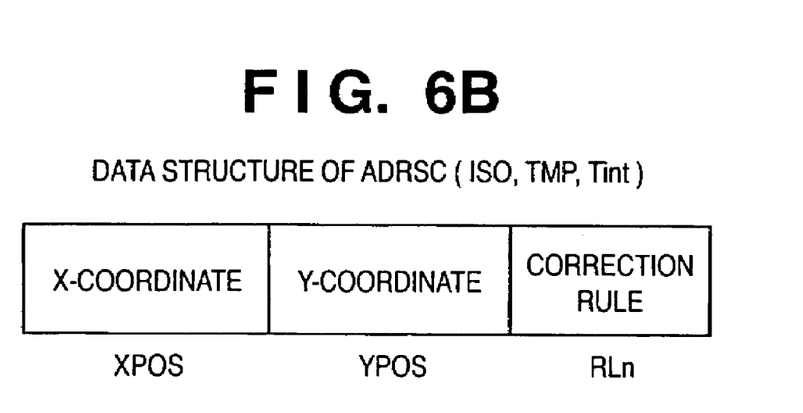

FIG. 6B shows the data structure of defect address ADRS (ISO, TMP, Tint). If the ISO speed, temperature, and accumulation time are used as input arguments, X-coordinate XPOS, Y-coordinate YPOS, and correction rule RLn are used as output arguments. With this structure, the coordinate position (consequently, address) of a pixel which is to undergo defect correction is specified, and its correction method is selected from the plurality of correction rules RL1 to RL6.

The digital camera of this embodiment comprises the defect address instruction circuit (controller) for specifying a defect address table on the basis of at least one of a plurality of parameters (factors) including the temperature, accumulation time, ISO speed, and the like, and generating a defect address on the basis of the specified defect address table, so as to realize an effective image correction system. As for pixels having dark voltages equal to or lower than a level that can assure a desired range of the dynamic range (full range) of the A/D converter as an effective dynamic range, their pixel signals are corrected by dark correction. On the other hand, as for pixels having dark voltages beyond that level, their pixel signals are corrected by defect correction in accordance with the addresses provided by the defect address instruction circuit. In this manner, a high-quality image can be obtained. That is, the digital camera of this embodiment changes the shares of dark correction and defect correction on the basis of information which pertains to image sensing, e.g., information that pertains to factors such as the temperature, accumulation time, ISO speed, and the like, thus correcting pixel signals of pixels having large dark voltages while assuring a desired range as an effective dynamic range. This is especially effective for a system such as a digital still camera that changes the amplifier gain in accordance with the ISO speed. That is, the occupation ratio of dark voltage nonuniformity in the value obtained by an A/D converter changes upon a change in ISO speed (amplifier gain). The digital camera of this embodiment can correct an image signal in correspondence with a change in occupation ratio of dark voltage nonuniformity. Note that the signal may be amplified not by the amplifier gain but by output control of an A/D converter or the like. However, in case of the output control of an A/D converter, it may become harder to control the signal than the amplifier gain.

More specifically, according to this embodiment, a digital camera can meet requirements "usable over a broad temperature range", "usable even for a long shutter time", and "usable even at high ISO speed" for high-end digital cameras, and can provide very beautiful images.

The scope of the present invention includes a case wherein a program code of software for implementing the functions of the above embodiment is supplied to a computer (CPU or MPU) of the digital camera, and the computer operates in accordance with the supplied program.

In this case, the program code itself of software implements the functions of the above embodiment, and the program code itself and means for supplying the program code to the computer (e.g., a recording medium that stores such program code) constitutes the present invention. As the recording medium for storing such program code, for example, a floppy disk, hard disk, optical disk, magnetooptical disk, CD-ROM, magnetic tape, nonvolatile memory card, ROM, or the like may be used.

Note that the embodiment is merely an example of embodiment upon practicing the present invention, and the technical scope of the present invention must not be construed to be strictly limited to such embodiment. That is, various modifications of the present invention may be made without departing from its technical scope or principal features.

As described above, according to the present invention, a high-quality image can be generated while assuring, e.g., a broad effective dynamic range.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus which processes an image signal, comprising:
   an image sensing element having a plurality of photoelectric conversion units each corresponding to a plurality of pixels outputting image signals and dark signals, the dark signals being signals output from the pixels in the dark;
   a determining unit which determines whether a dark level of an image signal from one of the plurality of pixels is higher than a predetermined level;
   a first correction unit which corrects the image signal from the one of the plurality of pixels using image signals from other pixels, when the dark level of the image signal from the one of the plurality of pixels is higher than the predetermined level;
   a second correction unit which corrects the image signal from the one of the plurality of pixels, by subtracting the dark signal from the image signal, when the dark level of the image signal from the one of the plurality of pixels is equal to or lower than the predetermined level; and
   a controller which selectively changes the predetermined level in accordance with information that pertains to image sensing.

2. The apparatus according to claim 1, wherein the information that pertains to image sensing includes at least one of a temperature, an accumulation time of said image sensing element, and an ISO speed.

3. The apparatus according to claim 1, wherein the information that pertains to image sensing includes a temperature, an accumulation time of said image sensing element, and an ISO speed.

4. The apparatus according to claim 1, wherein said controller comprises: a plurality of defective pixel tables prepared in correspondence with a plurality of image sensing conditions; and a defective pixel instruction unit which selects one defective pixel table from said plurality of defective pixel tables on the basis of the information that pertains to image sensing, and indicates a defective pixel to be corrected by said first correction unit thereto on the basis of the selected defective pixel table.

5. The apparatus according to claim 4, wherein the information that pertains to image sensing includes at least one of a temperature, an accumulation time of said image sensing element, and an ISO speed.

6. The apparatus according to claim 4, wherein the information that pertains to image sensing includes a temperature, an accumulation time of said image sensing element, and an ISO speed.

7. The apparatus according to claim 6, wherein said first correction unit determines a pixel value of a defective pixel to be corrected on the basis of an average value of surrounding pixels of that defective pixel.

8. The apparatus according to claim 1, wherein said first correction unit determines a pixel value of a defective pixel to be corrected on the basis of surrounding pixels of that defective pixel.

9. The apparatus according to claim 1, wherein said image sensing element includes a CCD sensor.

10. The apparatus according to claim 1, wherein said image sensing element includes a CMOS sensor.

11. An image processing method which processes an image signal sensed by an image sensing element having a plurality of photoelectric conversion units each corresponding to a plurality of pixels outputting image signals and dark signals, the dark signals being signals output from the pixels in the dark, comprising:
   determining whether a dark level of an image signal from one of the plurality of pixels is higher than a predetermined level;
   first correcting the image signal from the one of the plurality of pixels using image signals from other pixels, when the dark level of the image signal from the one of the plurality of pixels is higher than the predetermined level;
   second correcting the image signal from the one of the plurality of pixels, by subtracting the dark signal from the image signal, when the dark level of the image signal from one of the plurality of pixels is equal to or lower than the predetermined level; and
   selectively changing the predetermined level in accordance with information that pertains to image sensing.

12. The method according to claim 11, wherein the information that pertains to image sensing includes at least one of a temperature, an accumulation time of the image sensing element, and an ISO speed.

13. The method according to claim 11, wherein the information that pertains to image sensing includes a temperature, an accumulation time of the image sensing element, and an ISO speed.

14. The method according to claim 11, wherein one defective pixel table is selected from a plurality of defective pixel tables prepared in correspondence with a plurality of image sensing conditions on the basis of the information that pertains to image sensing, and a defective pixel to be corrected is specified on the basis of the selected defective pixel table.

15. The method according to claim 14, wherein the information that pertains to image sensing includes at least one of a temperature, an accumulation time of the image sensing element, and an ISO speed.

16. The method according to claim 14, wherein the information that pertains to image sensing includes a temperature, an accumulation time of the image sensing element, and an ISO speed.

17. The method according to claim 11, wherein a pixel value of a defective pixel to be corrected is determined on the basis of surrounding pixels of that defective pixel.

18. The method according to claim 17, wherein a pixel value of a defective pixel to be corrected is determined on the basis of an average value of surrounding pixels of that defective pixel.

19. The method according to claim 11, wherein the image sensing element includes a CCD sensor.

20. The method according to claim 19, wherein one defective pixel table is selected from a plurality of defective pixel tables prepared in correspondence with a plurality of image sensing conditions on the basis of information that pertains to image sensing, and a defective pixel to be corrected is specified on the basis of the selected defective pixel table.

21. The method according to claim 20, wherein a pixel value of a defective pixel to be corrected is determined on the basis of surrounding pixels of that defective pixel.

22. The method according to claim 11, wherein the image sensing element includes a CMOS sensor.

23. A computer-readable medium that stores a computer program for implementing an image processing method which processes an image signal sensed by an image sensing element having a plurality of photoelectric coversion units each corresponding to a plurality of pixels outputting image signals and dark signals, the dark signals being signals output from the pixels in the dark, said computer-readable medium comprising:
   determining whether a dark level of an image signal from one of the plurality of pixels is higher than a predetermined level;
   first correcting the image signal from the one of the plurality of pixels using image signals from other pixels, when the dark level of the image signal from the one of the plurality of pixels is higher than the predetermined level;
   second correcting the image signal from the one of the plurality of pixels, by subtracting the dark signal from the image signal, when the dark level of the image signal from one of the plurality of pixels is equal to or lower than the predetermined level; and
   selectively changing the predetermined level in accordance with information that pertains to image sensing.

24. A computer-readable medium encoded with a computer program to implement an image processing method which processes an image signal sensed by an image sensing element having a plurality of photoelectric conversion units each corresponding to a plurality of pixels outputting image signals and dark signals, the dark signals being signals output from the pixels in the dark, comprising:
   determining whether a dark level of an image signal from one of the plurality of pixels is higher than a predetermined level;
   first correcting the image signal from the one of the plurality of pixels using image signals from other pixels, only when the dark level of the image signal from the one of the plurality of pixels is higher than the predetermined level;
   second correcting the image signal from the one of the plurality of pixels, by subtracting the dark signal from the image signal, when the dark level of the signal from one of the plurality of pixels is equal to or lower than the predetermined level; and
   selectively changing the predetermined level in accordance with information that pertains to image sensing.

* * * * *